US007280914B2

(12) United States Patent  (10) Patent No.: US 7,280,914 B2
Bulatao et al.  (45) Date of Patent: Oct. 9, 2007

(54) INSTRUMENTED LOCK ENTRY AND TRAVERSING SYSTEM

(75) Inventors: Juana Victoria Bulatao, Makait (PH); Ty Leonard van den Akker, Meridian, ID (US); Enrique Bravo, Muntinlupa (PH); Min Cheol Cho, Seoul (KR); Guogiang Pan, Foshan (CN); Richard Grace, Pittsburgh, PA (US); Tridas Mukhopadhyay, Pittsburgh, PA (US)

(73) Assignee: Port of Pittsburgh Commission, Pittsburgh, PA (US)

( * ) Notice: Subject to any disclaimer, the term of this patent is extended or adjusted under 35 U.S.C. 154(b) by 358 days.

(21) Appl. No.: 10/708,449

(22) Filed: Mar. 4, 2004

(65) Prior Publication Data

US 2005/0090971 A1    Apr. 28, 2005

Related U.S. Application Data

(60) Provisional application No. 60/480,218, filed on Jun. 20, 2003.

(51) Int. Cl.
   *G01C 21/26* (2006.01)
(52) U.S. Cl. .................. 701/207; 701/200; 701/28; 342/41; 342/46; 342/47; 340/984; 340/985
(58) Field of Classification Search ................ 701/200, 701/207, 23–28, 213–215; 342/357.06, 357.08, 342/357.09, 23, 41, 46–47, 104, 107, 114; 340/984–985
   See application file for complete search history.

(56) References Cited

U.S. PATENT DOCUMENTS

| | | | |
|---|---|---|---|
| 4,063,240 A * | 12/1977 | Isbister et al. ................ 342/21 |
| 5,448,487 A | 9/1995 | Arai | |
| 5,754,429 A | 5/1998 | Ishihara et al. | |
| 5,808,193 A * | 9/1998 | Syska et al. ............. 73/170.05 |
| 5,916,284 A | 6/1999 | Ishihara et al. | |
| 5,983,161 A | 11/1999 | Lemelson et al. | |
| 6,188,958 B1 | 2/2001 | Gu et al. | |
| 6,275,773 B1 | 8/2001 | Lemelson et al. | |
| 6,370,475 B1 | 4/2002 | Breed et al. | |
| 6,385,532 B1 | 5/2002 | Dance et al. | |
| 6,405,132 B1 | 6/2002 | Breed et al. | |
| 6,411,871 B1 | 6/2002 | Lin | |

(Continued)

OTHER PUBLICATIONS

Qi Qingwen, Application of GeoObject-Graphic-Pattern (TUPU) in Cartographic Generalization , Department of Cartography, Institute of Geography, Chinese Academy of Sciences, Beijing, 100101, P.R. China.

(Continued)

*Primary Examiner*—Yonel Beaulieu
(74) *Attorney, Agent, or Firm*—Buchanan Ingersoll & Rooney PC

(57) ABSTRACT

An instrumented navigation system for aiding a towboat and barge configuration in the entry and traversal of a lock located on a waterway or for navigation around other structures, such as bridge piers or docks. The system consists of wirelessly linked computers on the towboat and the lock which display navigational charts showing the position of the tows as they approach and enter the locks. The computers are also linked to sensors which send information, such as the speed and position of the tows, to the computers for display.

27 Claims, 12 Drawing Sheets

SmartLock System Network Topology

U.S. PATENT DOCUMENTS

| | | | |
|---|---|---|---|
| 6,456,941 | B1 | 9/2002 | Gutierrez |
| 6,469,641 | B1 | 10/2002 | Lash et al. |
| 6,487,500 | B2 | 11/2002 | Lemelson et al. |
| 6,507,810 | B2 | 1/2003 | Razavi et al. |
| 6,519,466 | B2 | 2/2003 | Pande et al. |
| 6,549,846 | B1 | 4/2003 | Dance et al. |
| 6,553,308 | B1 | 4/2003 | Uhlman et al. |
| 6,591,188 | B1 | 7/2003 | Ohler |
| 6,677,889 | B2 * | 1/2004 | Van Rees et al. ............. 342/41 |
| 6,707,414 | B2 * | 3/2004 | Van Rees et al. ............. 342/23 |
| 6,995,662 | B2 * | 2/2006 | Wortsmith ................. 340/435 |
| 2003/0137443 | A1 | 7/2003 | Rees et al. |
| 2003/0146854 | A1 | 8/2003 | Jones |
| 2003/0156039 | A1 | 8/2003 | Tester |

OTHER PUBLICATIONS

Dr. Reinhard Pfliegel, River Information Services on the Danube Opening of the Ris Test Centre in Vienna (Doris), via Donau—Entwicklungsgesellschaft mbH for Telematik and Donauschiffahrt, Donau-City-Strasse 1, A-1220 Vienna, Austria, Seite 1 von 14, copyright by via donau Oct. 1, 2003.

Neal G. Millett and Simon Evans, Hydrographic Data Management using GIS Technologies, Environmental Systems Research Institute, Inc. 380 New York St., Redlands, CA 92373-8100.

* cited by examiner

Figure 1 Schematic of the Present Invention's Architecture

Figure 7-2. SmartLock System Network Topology

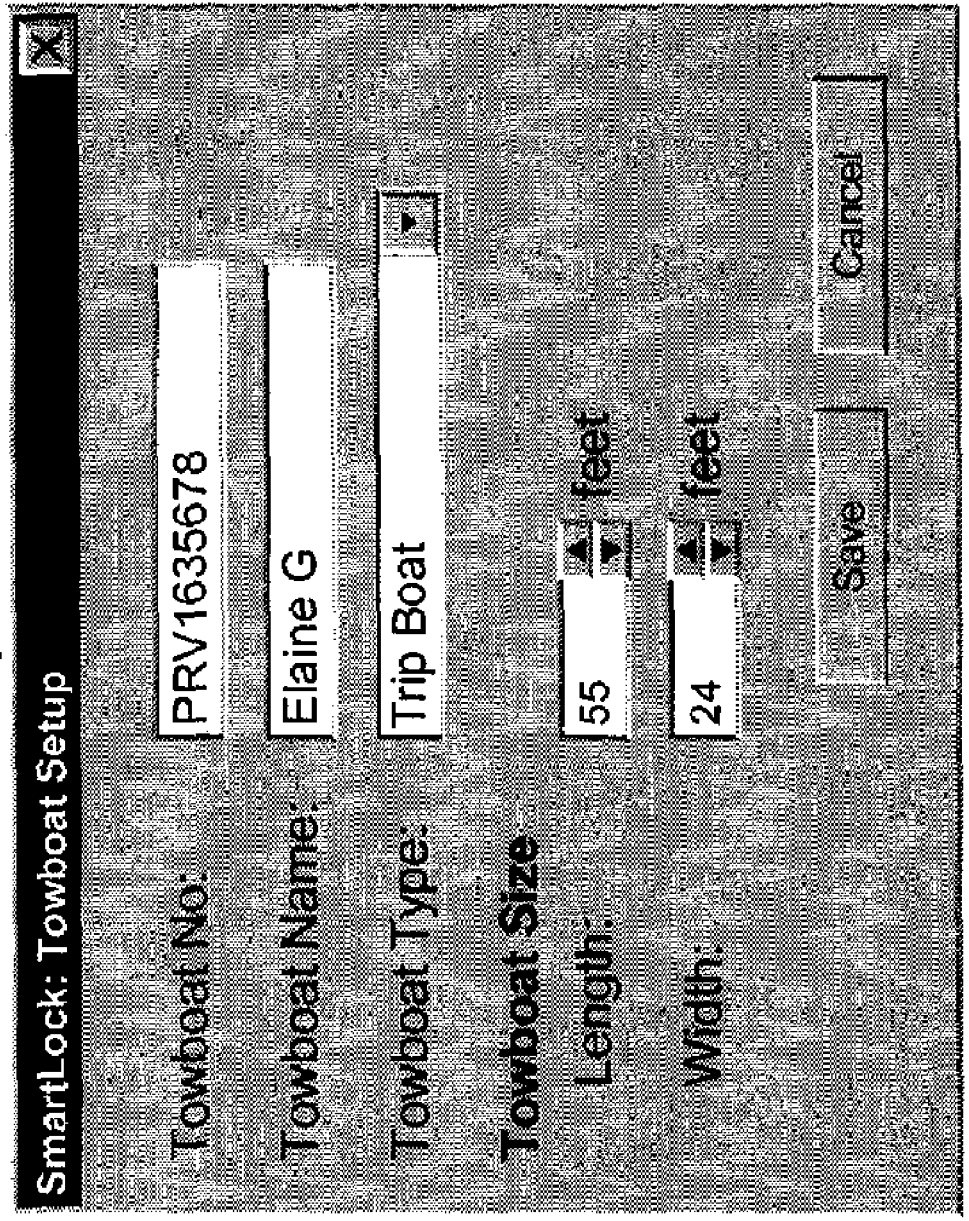
Figure 4 Towboat Setup

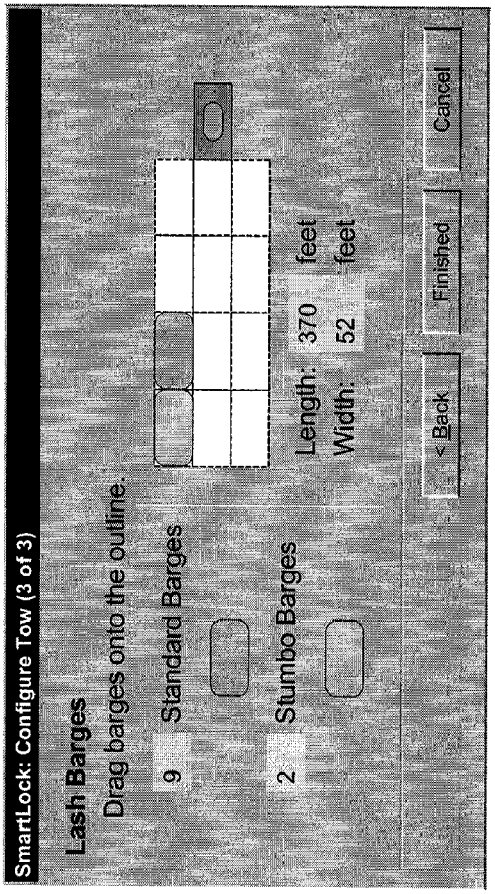
Figure 5 Configure Tow
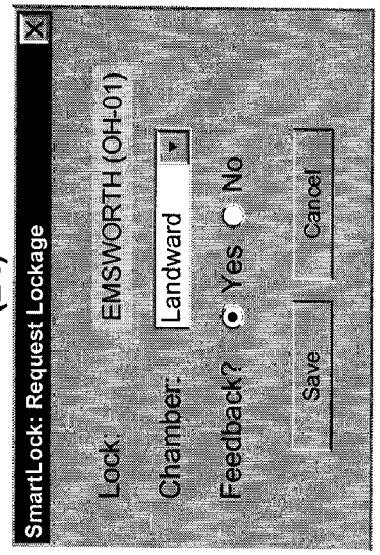
Figure 6 Request Lockage (26)

SmartLock: Lock Conditions

Dam Opening: 10 feet

Upstream River Current
Direction: ● In ○ Out
Strength: Weak ▼

Downstream River Current
Direction: ● In ○ Out
Strength: Weak ▼

Wind
Direction: North ▼
Strength: Weak ▼

Update    Cancel

Figure 7 Update Lock Conditions

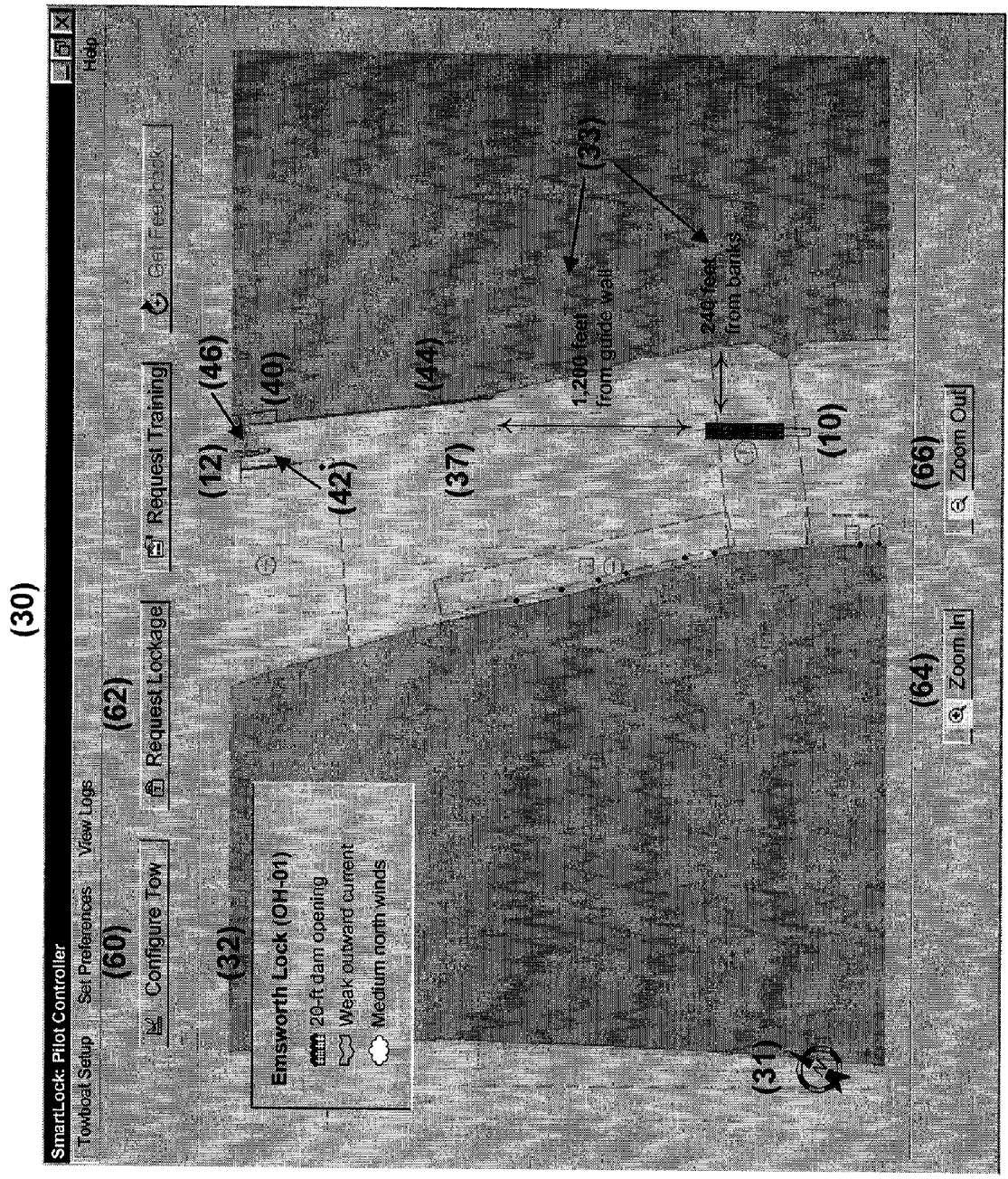
Figure 8 Pilot Display for Tow Approaching the Lock

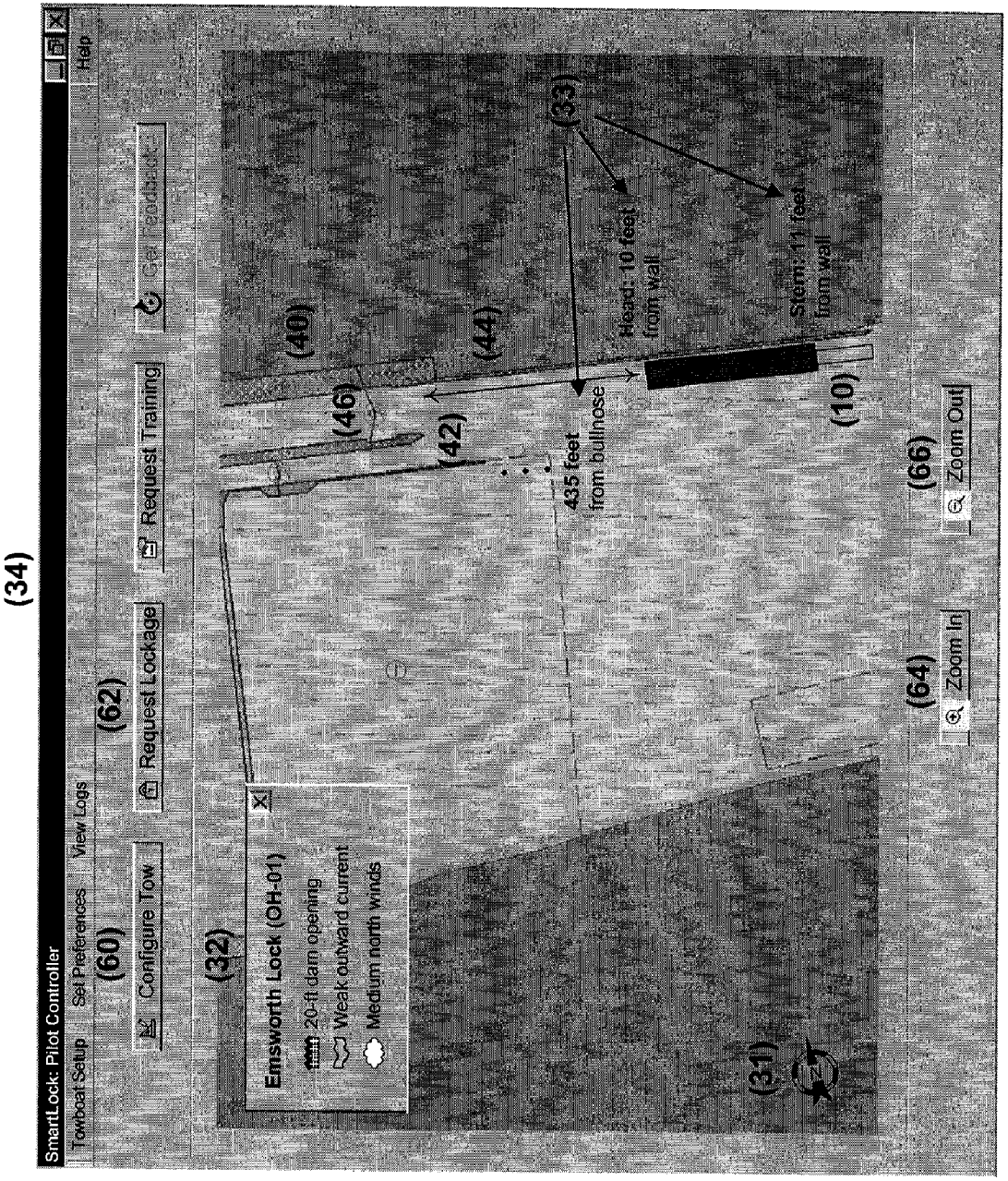
Figure 9 Pilot Display for Tow at the Lock

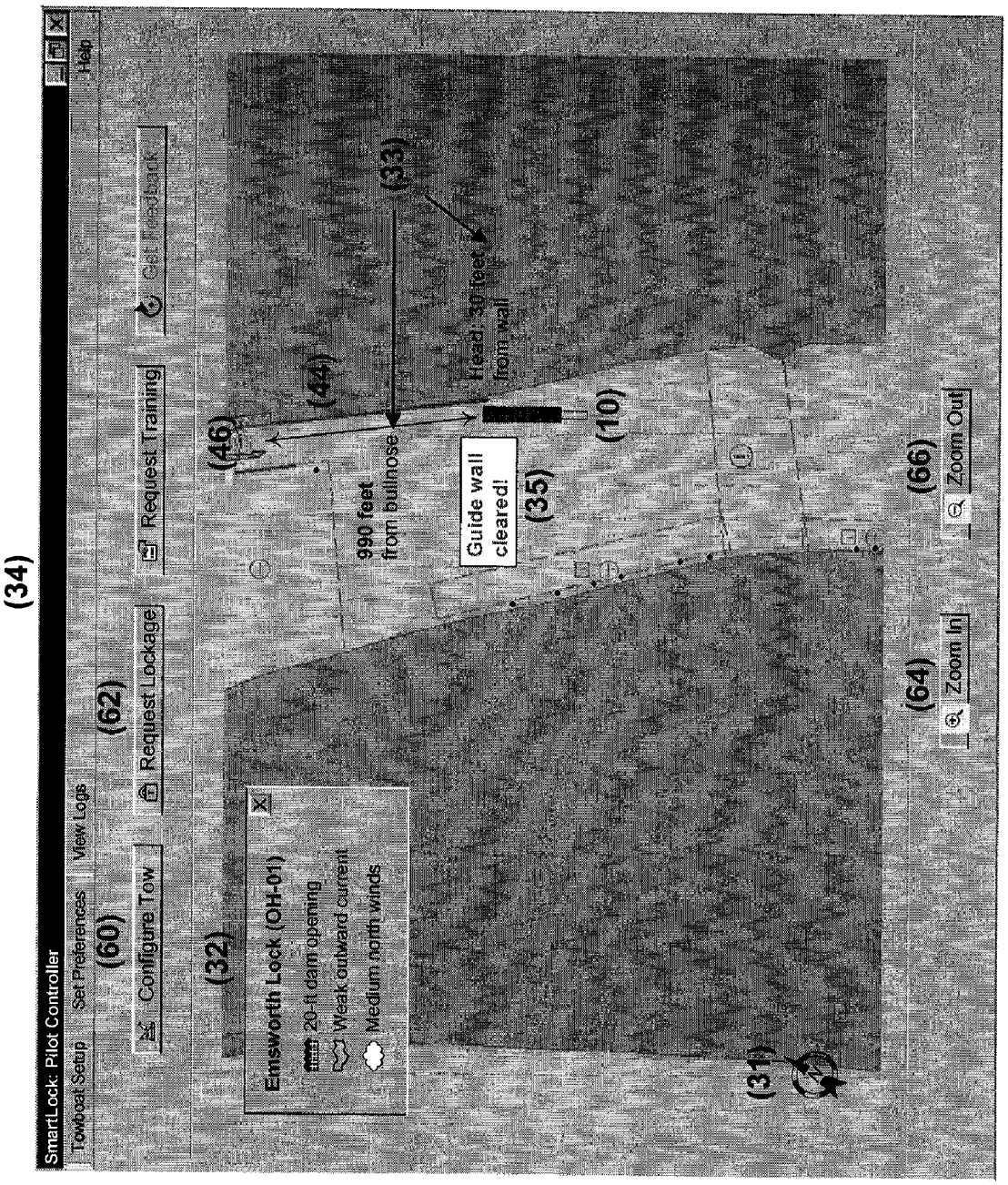
Figure 10 Pilot Display with Sample Alert

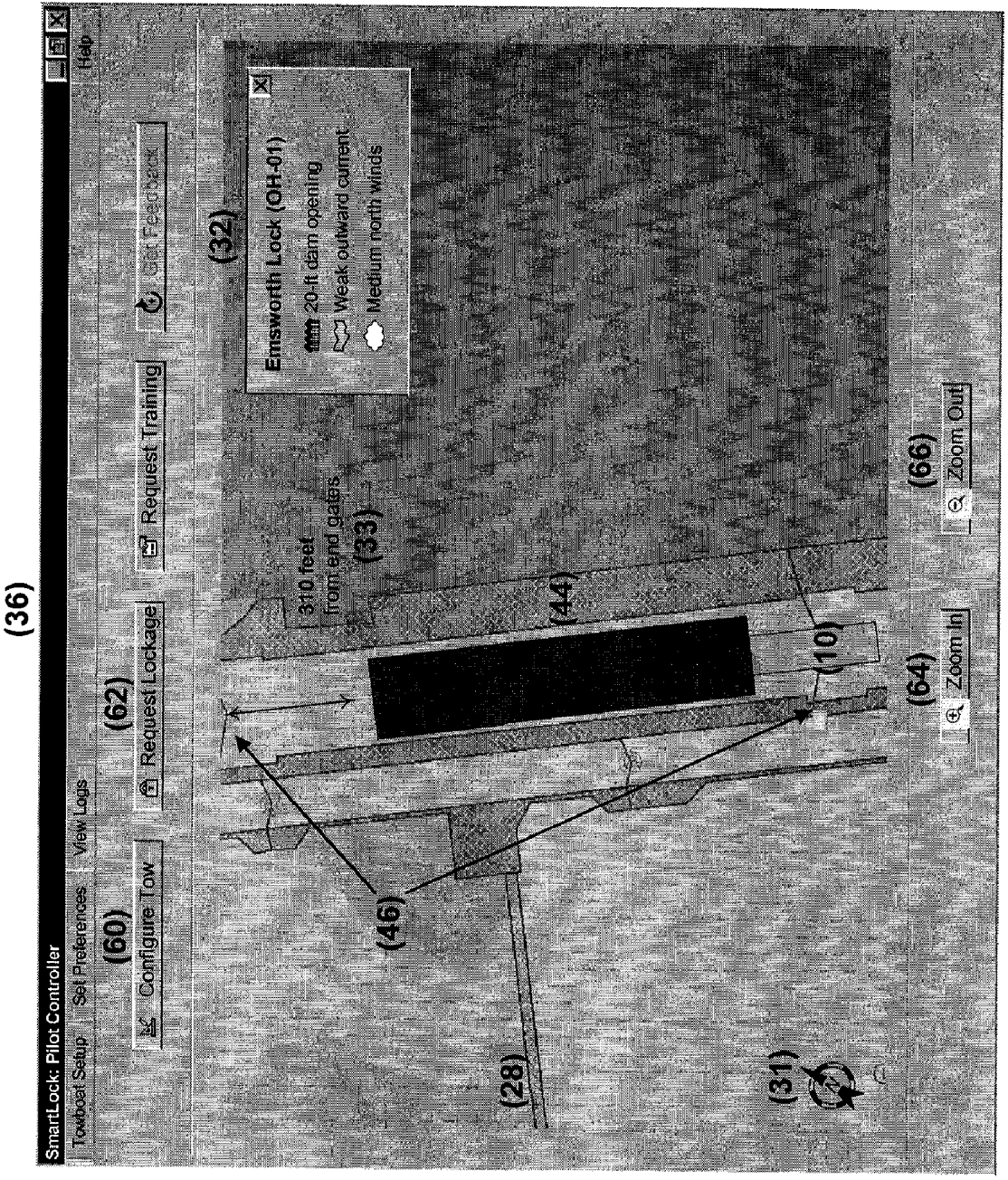
Figure 11 Pilot Display with Tow Inside the Lock

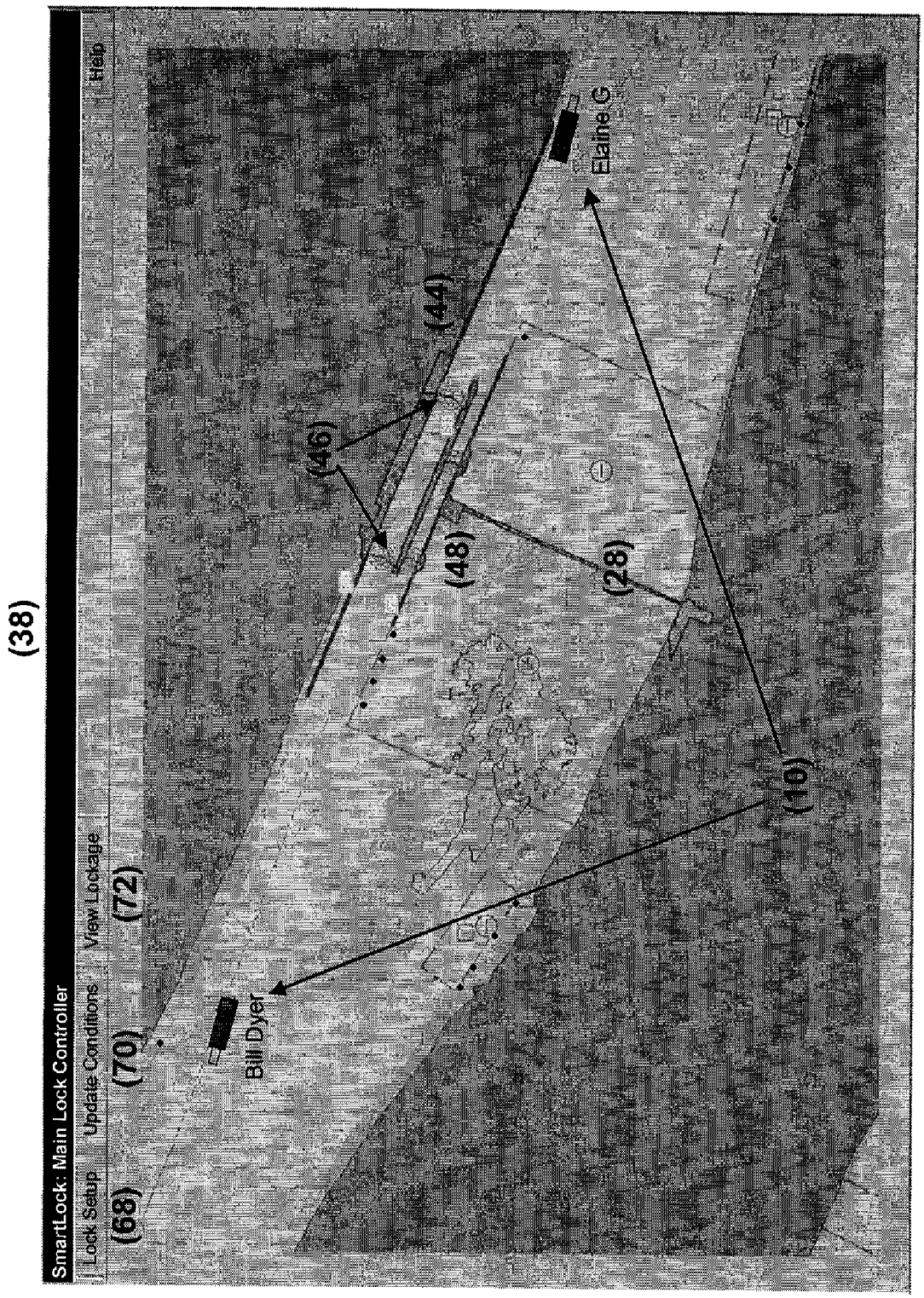
Figure 12 Lockmaster Display

INSTRUMENTED LOCK ENTRY AND TRAVERSING SYSTEM

RELATED APPLICATIONS

This application claims the benefit under 35 U.S.C. § 1.19(e) of U.S. Provisional Application No. 60/480,218, filed Jun. 20, 2003.

FIELD OF THE INVENTION

This invention relates to a navigation aid and system and, in particular, to a system that provides tow pilots navigating inland waterways with real-time information essential to efficient and safely transiting locks in various weather conditions.

BACKGROUND OF INVENTION

Every year, thousands of tons of commodities are transported along the nation's inland waterways via a combination of towboats and barges, referred to collectively as a "tow." There are four main types of barges, including: open, closed, sealed and liquid. Each type has three different sizes: a standard barge is 26'×175'; a jumbo barge is 35'×195' and a "stumbo" barge is 26'×195'. Typically, a single tow can have up to 15 barges. The average barge can carry a approximately 1,500 tons of a given commodity, a payload equal to about 60 typical tractor/trailer style trucks commonly seen on America's highways. This large payload capacity makes transferring commodities by barge more efficient than any other means of commercial transportation.

The inland waterway system in the U.S. contains many locks and dams, typically built by the Army Corps of Engineers, to prevent flooding in low-lying riverside areas and to provide for stable navigation. To traverse the dams, it is necessary that the tows negotiate passage through many locks. As an example, to transport a commodity from Pittsburgh to St. Louis along the Ohio River, it is necessary for a tow to pass through over twenty locks. The dimensions of many old locks are such that every time a tow has to traverse a lock, it may have to perform double or even triple lockage, depending on river conditions and tow size. This can cause bottlenecks along the river. A single accident at a lock can cause exponential river jams. In addition to varying lock configuration, weather conditions, such as fog, darkness, harsh river conditions, and other variables provide a significant amount of unpredictability.

The locking process has a history of nearly a century without much innovation. Almost every lock approach is unique because of variables such as lock dimensions and configuration, current speed, visibility, water levels, tow configurations, etc. All of these variables play a part in determining a safe and speedy lockage. Traversing locks requires a high degree of precision and piloting skill; the usual allowable clearance between the lock wall and the tow may be as little as 2.5 feet on each side of the tow. This makes it very difficult for pilots who are unfamiliar with a lock to navigate it successfully in an efficient manner.

Traditionally, the locking process is a slow and manual operation with complete reliance on the judgment of the tow pilot and communication of the tow's position by deckhands via handheld radios. Locks present a serious threat to the safety and efficiency of the inland waterways because of expensive accidents, decreased throughput and delay costs that can lead to unreliable delivery schedules and, on occasion, cargo loss resulting from collisions with locks. Thus, there is a need for a system to address many of the issues that often delay freight while being transported on the river system.

By improving a captain's ability to navigate locks in fog, reducing lock transit times, and decreasing the number of debilitating accidents, the waterborne shipping industry could realize tremendous annual savings. Further, increased predictability and decreased transit times would allow more cargo to use the environmentally friendly in-land waterways, thereby reducing traffic on strained road and rail systems and increasing the economic importance of areas in which waterways reside.

Accordingly, it would be desirable to provide an electronic system that will improve the safety and efficiency of the inland waterway system by reducing shipping bottlenecks and improving predictability. First, such a system would preferably reduce average delay and lockage times by providing a way of navigating locks in adverse weather, and in particular, in foggy conditions. Second, it is desired that the dependence of the tow pilot on deckhands for information regarding tow position with respect to the locks be reduced.

SUMMARY OF INVENTION

In response to the deficiencies noted above, the present invention provides an instrumented lock entry and traversing system. The instrumented lock entry and traversing system is a sensor-based interface system which feeds valuable information through a local area network (LAN) to a computer on a towboat in real time to assist the pilot in navigating a lock. Additionally, the system may also be used to assist the entry and passage of watercraft in closed or narrow quarters, such as harbors, docks and bridge piers. In addition, the system can also provide data collection capabilities for both the tow operator and the lock operator.

As a navigation aid, the present invention is capable of determining the tow distance from key lock structures at the three major stages of a lock approach: 1) when the tow is approximately one half of a mile away from the lock structure; 2) when the tow is at the lock; and, 3) when the tow is inside the lock chamber.

The pilot begins his approach when the tow is approximately one half of a mile away from the lock structure. At this point the system provides him with the distance of the tow from the furthest point on the bank and the distance of the tow head from the tip of the lock guide wall. At this stage of the approach the distances can be updated every five seconds and need to be accurate within at least 10-15 feet.

The tow is considered to be at the lock when the tow head reaches the lock guide wall. At this point the system informs the pilot of the distance of the tow from the bullnose, (the tip of the middle wall of the lock) and the distance of the tow head and the tow stern from the lock guide wall, if the tow is locking into the landward chamber of the lock, or the lock guard wall, if the tow is locking into the riverward chamber of the lock. For this stage of the approach, the distances are preferably updated in real time and need to be accurate within one foot.

Once the tow passes the bullnose, the tow is considered to be inside the lock chamber. At this stage of the approach the system continues to provide the pilot with the distance of the tow head and tow stern from the relevant wall. In addition, the system now informs the pilot of the distance of the tow from the end gates of the lock.

The system comprises four basic components: a pilot interface for providing the pilot with information important for a safe lock transit; a lockmaster interface, for monitoring tows approaching the lock and for inputting local waterway and lock conditions; a wireless network for relaying information between the pilot interface and the lockmaster interface; and, one or more input modules, located anywhere throughout the world, including at the lock and on the tow, that transmit information to the pilot and/or the lockmaster.

The pilot interface consists of visual and/or audio means for delivering the desired information to the pilot, preferably a computer having a visual display and/or audio output devices. Among other information, the following specific information can be supplied to the pilot: tow location with respect to the recommended approach path for the lock; distances between various points on the tow and the lock; weather and river conditions at the lock and the speed of the tow. In addition, the pilot interface can sound warning alarms for such things as approach error and over speed conditions. Preferably, the pilot interface will provide an electronic rendering of a navigation chart for a lock to be navigated, with a representation of the tow and imposed on the chart.

The second component of the present invention is the wireless network which connects the pilot interface to the lockmaster interface, and, in addition, may also connect input modules or sensor modules to the pilot interface. Preferably, the wireless network will provide automatic connection capabilities when the tow is within receiving distance of a wireless signal from the lock, and will provide for the secure exchange of information regarding river and lock conditions from the lock to the tow. Additionally, the pilot interface on the tow may be able to automatically generate and transmit requests for lockage to the lockmaster, and receive clearance from the lockmaster to enter the lock.

The lockmaster interface displays tows within range of the lock wireless signal and displays the details of lockages. The system allows the lockmaster to see which tows are using the system, their progress in the approach to the lock, what lockages are requested (i.e., upstream, down-stream, landward, riverward, etc.), what lockages are being logged, and what critical events have been triggered. It also provides an interface for the lockmaster to update the current lock, river and weather conditions for transmission to the tow pilots. The information transmitted may include, for example, information regarding the direction and strength of waterway currents, current wind direction and speed and fog alerts. Additionally, information regarding the current status of the lock may be transmitted, as well as any special conditions existing in the vicinity of the lock, such as unusual eddies and currents.

The last component of the system consists of one or more input modules for inputting varied information to the pilot interface. Preferably, at least one input module will provide information regarding the position of various portions of the tow and will utilize global positioning system ("GPS") technology, possibly having multiple GPS receivers located at different positions on the tow. Additional modules may include a module to gather manually entered lock configuration data from lock operators, modules transmitting real-time weather information from a location at or near the lock or from the National Weather Center and modules for inputting data from other types of sensors, such as, for example, land-based or tow-based sonar or radar units to provide additional information regarding the range and speed of the tow.

An additional function of the present invention is to provide a point of data collection regarding tows and lockages. As an example, the following types of information could be collected, assembled and shared between the tow and the lock or between upstream and downstream locks: manifest information, tow configuration information, lockage times, including times for the various stages of the lockage, lockage information, such as chamber used, number of cuts, type of lockage (i.e., single, double), etc., trip information, such that an electronic log of the tows progress can be assembled and a history of lock condition information (i.e., typical lockage times given a particular set of conditions, etc.). Such information may also be useful for tow operators to track the positions of their tows along the waterways and to collect historical data relating to tow operations for the purposes of assessing and improving tow performance.

Other features, aspects and advantages of the present invention will become better understood or apparent from the following detailed description, drawings and appended claims of the invention.

BRIEF DESCRIPTION OF DRAWINGS

FIG. 4 is a screen which would appear on the pilots interface showing a setup of the tow boat.

FIG. 5 is a configuration screen that would appear on the pilots interface showing how to setup the large configuration with the tow boat.

FIG. 6 is a pop up screen that would appear on the pilot's interface to request lockage through a particular lock.

FIG. 7 is a pop up screen that would appear on the lockmasters interface showing how the current conditions of the river and damn are updated.

FIG. 8 is a screen that would appear on the pilots interface during the tow's approach to the lock.

FIG. 9 is a screen that would appear on the pilots interface when the tow is at the lock and ready to enter the lock chamber.

FIG. 10 is a screen that would appear on the pilots interface showing a pop up alert for an event that has occurred due to progress of the tow through the lock.

FIG. 11 is a screen that would appear on the pilots interface showing the tow in the lock chamber.

FIG. 12 is a screen that would appear on the lock masters interface that would allow the lockmaster to view lockages and tows waiting for or requesting lockages.

DETAILED DESCRIPTION

Figure 1:
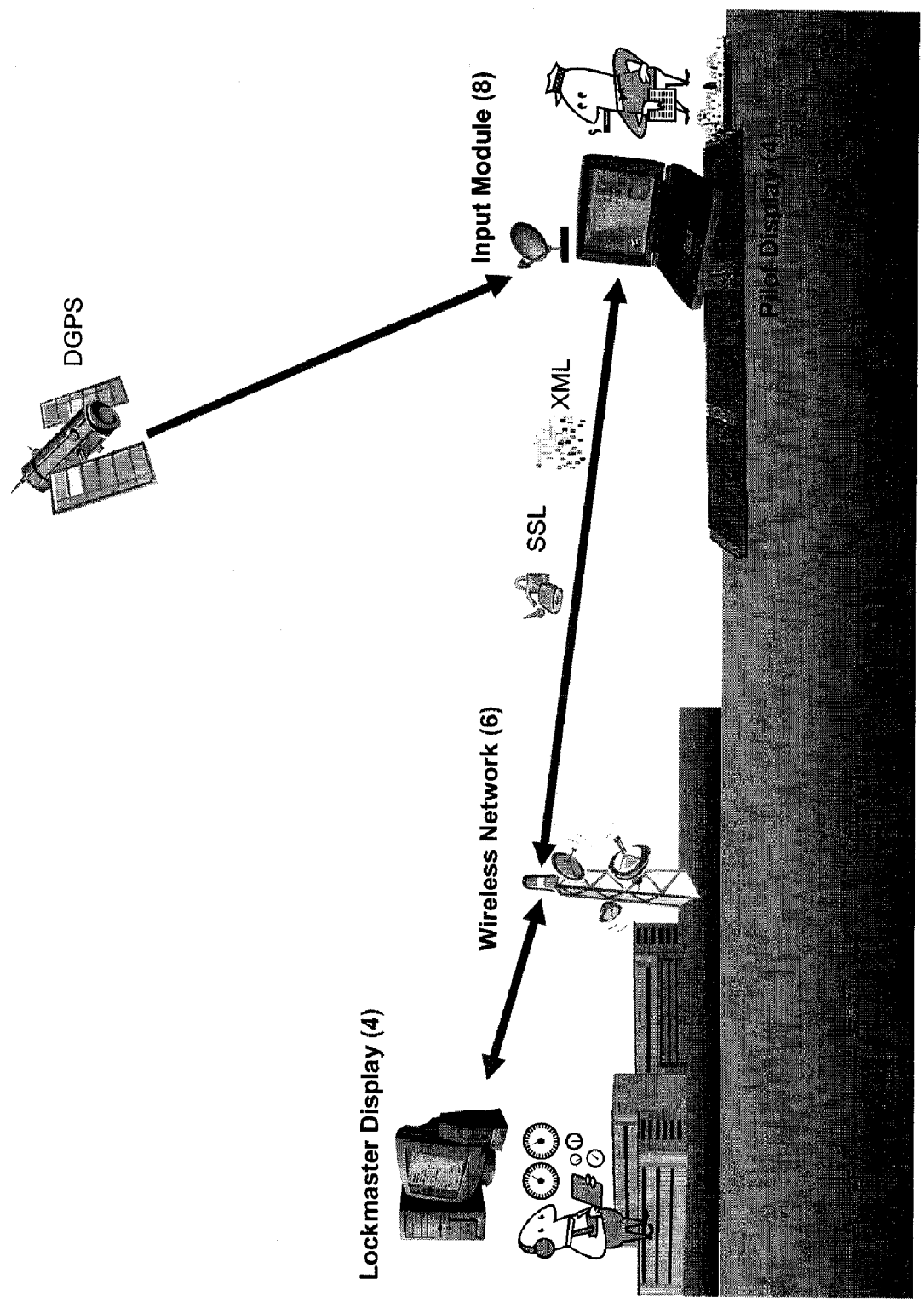
FIG. 1 shows a schematic of the topology of the present invention showing the four main components.

FIG. 1 shows a schematic of the topology of the present invention showing the four main components, namely, pilot interface 2, which is located on board a tow or other watercraft, lockmaster interface 4, located on the land-based side of the lock, wireless network 6, which is used to communicate information between tow interface 2 and lockmaster interface 4, and input module 8 shown, in FIG. 1 as a differential GPS receiver, which is one of many types of input modules that could be used with the present invention.

Figure 2:
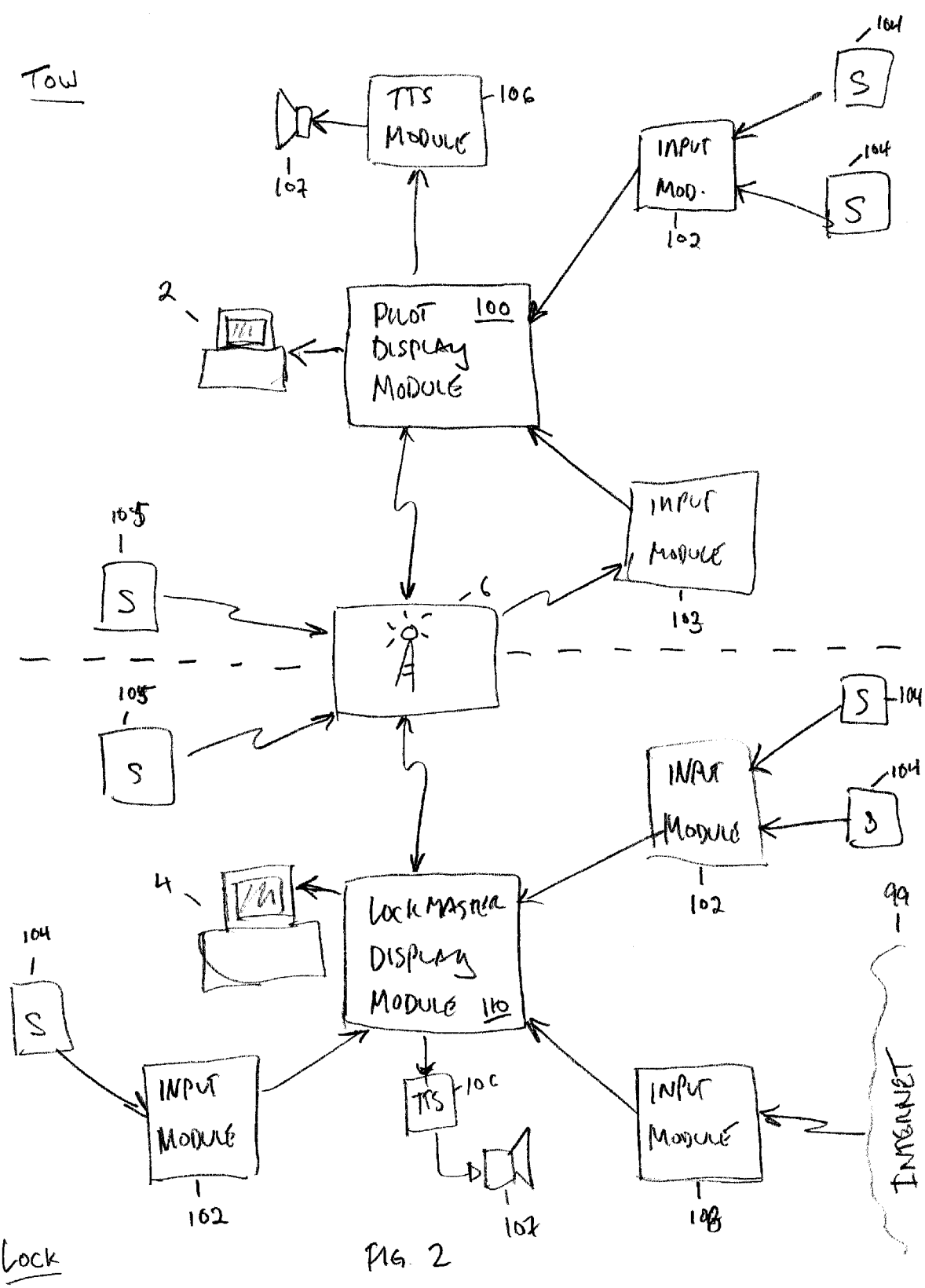
FIG. 2 shows a topology of the software modules and the interaction between the software modules and the sensors and network.

The software architecture of the present invention is shown in FIG. 2 and includes both tow based and land based portions. Pilot display module 100 runs on a computer on board tow 10 and is responsible for maintaining the pilot display and interacting with the pilot. Pilot display module 100 accepts inputs from various input sources, including sensors.

Sensors 104 may be, for example, differential GPS sensors, radar sensors, sonar sensors or any one of a number of other well known technologies for ranging and speed detection. Sensors 104 can interface directly to input module 102, which in turn formats and relays information to pilot display module 100. Alternatively, sensors 105 may wirelessly connect to wireless network 6 to transmit their information either directly to pilot display module 100 or to an intervening input module 103 which in turn formats and sends the data to pilot display module 100. Sensors 105 may have their own IP address and be connected directly to the network or may be connected through another component via a different wireless protocol, such as Bluetooth™. Pilot display module 100 may also utilize an optional text-to-speech (TTS) module 106 to provide audio feedback to the pilot of tow 10. For example, ranging information could be read by TTS module 106 such as to allow the pilot to receive this information without having to constantly visually monitor pilot interface 2. The output device in this case would be speaker 107.

The pilot display module 100 may also receive information via wireless network 6 from lockmaster display module 110, which is preferably running on a computer on the land based side of lock 12. Pilot interface 2 and lockmaster interface 4 may be a commonly available personal computers. Lockmaster display module 110 can also collect information from various land based sensors 104 connected directly to input module 102, which can format and prepare the information for display on lockmaster interface 4. In addition, the lockmaster display module 110 can receive speed and ranging information over a wireless network 6 directly from tow 10 via pilot display module 100. Land based sensors 105 could also wirelessly transmit its information to pilot display module 100 or lockmaster display module 110. Input module 108 may receive information from outside sources such as the National Weather Center over Internet 99 and can format and pass that information to lock master display module 110, which, may relay the information via wireless network 6 to pilot display module 100. Lockmaster display module 110 may also be configured with TTS module 106 driving speaker 107 to alert the lockmaster as to the tows 10 which are approaching the lock or which have come into range of the lock's wireless network signal and have established a connection with lockmaster display module 110.

Preferably, pilot display module 100 and lockmaster display module 110 can be implemented as an applet in a browser or as a stand alone application.

Figure 3:
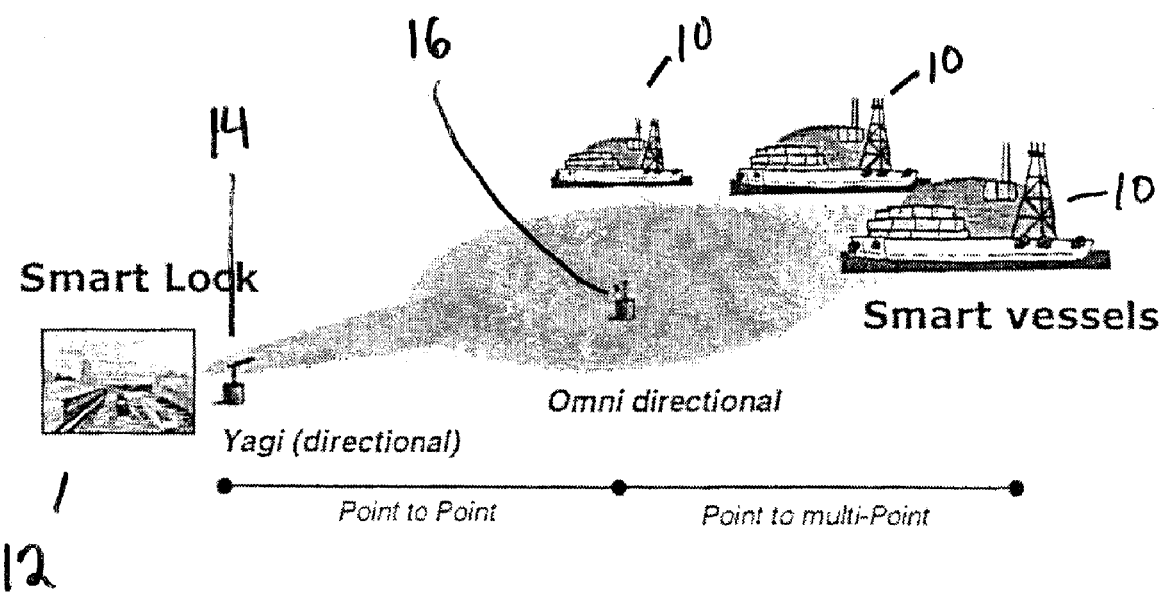
FIG. 3 shows a sample antenna configuration for communications between the lock and the vessels equipped with the present invention.

FIG. 3 shows a sample configuration of antennas which could be used to implement the wireless network for communications between tows 10 and lock 12. Preferably lock 12 will be equipped with a directional antenna 14, preferably an antenna known as a Yagi, which is a highly directional antenna, to direct the wireless network signal to both upstream and downstream approaching tows. In most circumstances lock 12 will be equipped with multiple directional antennas 14, typically one pointing up-stream for tows 10 approaching from that direction and one pointing down-stream for tows 10 approaching from that direction. In the event that there is a lack of line of site between lock 12 and tows 10 at the distance necessary to setup for the approach to lock 12, the wireless signal can be relayed via an omni-directional antenna 16 located remotely from the general vicinity of the lock, possibly on the opposing bank of the waterway, on the dam itself or on the landward side of the river where the lock is located.

The connection between tow 10 and lock 12 via wireless network 6 is preferably accomplished automatically as the tow 10 approaches lock 12 and comes in close enough proximity to lock 12 to acquire the network interface signal from directional antenna 14 or omni-directional relay antenna 16. However, the connection may also be established manually.

Preferably tow 10 is also equipped with an omni-directional antenna for communication both with lock 12 and with any on-board wireless sensors 105. In the preferred embodiment of the invention, the wireless network is a typical wireless link conforming to the 802.11(b) standard using internet protocols, such as TCP/IP and standard HTML messages. However, the wireless network link 6 may also be other types of connections, such as 802.11(a), 802.11(g) or any other type of well-known or proprietary network link, and may use other types of messages, such as MIML (Maritime Information Markup Language).

To properly use the system, it is necessary for tow 10 to tell the system about its configuration and, specifically, about dimensions of the tow boat and the barges in the tow. FIG. 4 shows input screen 20 used by the pilot of tow 10 to enter information regarding the tow boat. Screen 20 has spaces allowing the pilot to input the tow boat number, name and type as well as dimensions, including both length and width of the tow boat. Likewise, the over all tow configuration must be entered into the system using input screen 22 as show in FIG. 5. Input screen 22 provides a interface which allows the pilot to enter the configuration of the overall tow according to the number and type of barges currently being used and manner in which they are configured (i.e., notch, spike, etc.). Input screens 20 and 22 are invoked by pressing button 60 on pilot interface 2, as shown in FIGS. 8-11.

As stated previously, in the preferred embodiment of the invention, the network link between tow 10 and lock 12 will be made automatically as the tow 10 approaches lock 12 and acquires a signal over wireless network 6. At this point, pilot interface 2 as shown in FIG. 8 will show the position of tow 10 with respect to lock 12. As shown in FIG. 8, pop-up messages 33 show the distance from the head of tow 10 to the guide wall 44 and the distance of tow 10 from the bank of the waterway.

Preferably, the display utilizes electronic navigation charts conforming to the IHO S-57 standard, which is a standard for data exchange for electronic navigation charts published by the International Hydrology Organization. In the preferred embodiment of the invention, as the network link is made between tow 10 and lock 12, lock 12 will identify itself to tow 10 via some form of secured communication, preferably using secure socket layer (SSL) messaging to insure integrity of the data. The electronic navigation chart can then be looked up in a database on the computer in tow 10 or can be uploaded automatically from lock 12 to tow 10 via wireless network 6.

To request lockage through the lock, the tow pilot would click on button 62 as shown in FIGS. 8-11. FIG. 6 shows input screen 24, which appears as the result of pressing button 62, and which allows the tow pilot to specify which lock chamber as well as whether or not the tow pilot requests feed back for the lockage. Note that the lock name is not selectable by the pilot, as this information is provided by secure link by lockmaster interface 4 via the link between the tow 10 and lock 12.

Figure 13:
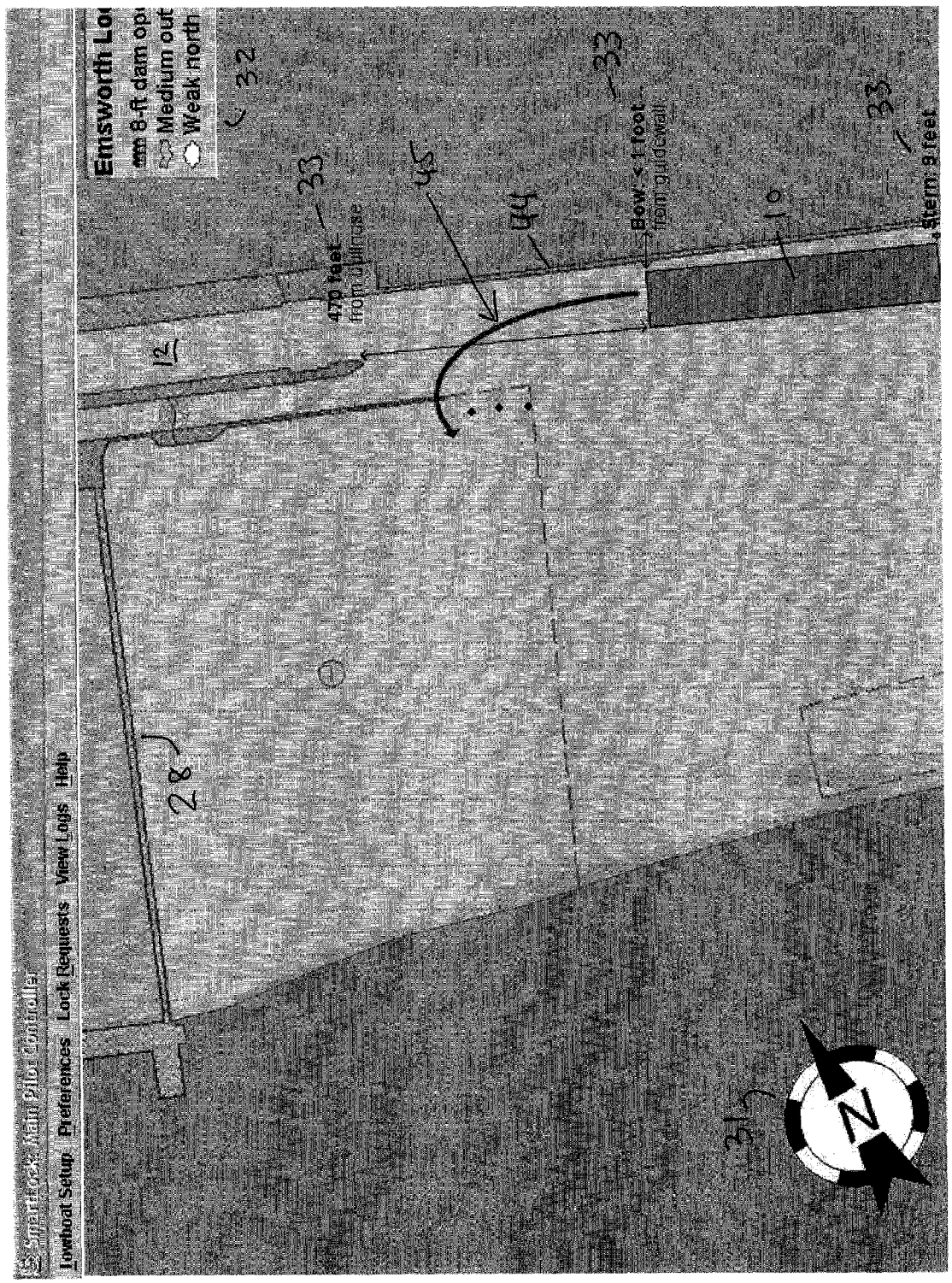
FIG. 13 is a screen that would appear on the pilot's interface showing the direction and strength of a current in the waterway.

FIG. 8 is the screen which is displayed as tow 10 approaches lock 12. After lockage has been requested using button 62 and the tow 10 has been informed that it is able to proceed through lock 12, feedback is given tow pilot as tow 10 approaches lock 12. Feedback includes lock, river and wind conditions as shown in window 32 in FIG. 8, but may also include any other information relevant to the lockage. Preferably, information regarding river current direction and speed can be provided graphically as shown in FIG. 13. Arrow 45 shows the direction a river current and the thickness of arrow 45 can be used to indicate the strength of the current. A similar arrow could be used to show wind speed and direction, with a different color arrow being used for wind as opposed to river currents.

In the example provided, window 32 shows that the dam has a 20 foot opening, the river has a weak outward current and winds are medium from the north. Pop-up messages 33, showing distance of tow 10 from the banks and lock 12, are also updated. At this distance from lock 12, distance information need only be updated every 5 seconds and need only be accurate to within 10 to 15 feet of the actual distance. In addition, line 37 is shown indicating the path of tow 10 as it approaches lock 37. Also shown in FIG. 8 is the speed 37 of tow 10.

As tow 10 approaches closer to lock 12, the screen is preferably zoomed automatically to show more detail with respect to lock 12 and to change the rate as which data flowing to the tow pilot is updated, as shown in FIG. 9. At this stage of the lockage, as tow 10 approaches guide wall 44 of lock 12 as shown in FIG. 9, it is necessary that the updates to the data be conveyed in real time and that the accuracy be increased, preferably to one foot resolution. Additionally, the distance of both the stern and bow of tow 10 from guide wall 44 are reported as pop-up messages 33. As can be seen in FIG. 9, tow 10 is considered to be at the lock when the head of tow 10 has passed the outer most portion of guide wall 44. At this point, tow 10 awaits for the opening of gates 46 to continue its approach to the lock.

FIG. 10 shows a pop up message 35 which will appear at various stages of the lockage. In this case the head of the tow has passed the guide wall and, as such, the "Guide Wall Cleared" message is displayed. Warnings such as for a deviation from the preferred approach path or for an over speed condition may be reported in a similar manner.

FIG. 11 shows tow 10 within the chamber of lock 12. At this point, the informational message 33 states the distance from the head of tow 10 to the end gates 46 of the lock. Additionally, the display is zoomed further and the scale changed to better show the actual position of tow 10 within the chamber of lock 12. As in the previous stage of the lockage, feedback of distance and speed data is preferably delivered in real time and with a minimum resolution of one foot.

FIG. 12 shows the screen of lockmaster interface 4.

Shown on the screen are tows 10 which are currently in communication with lockmaster display module 110 running on the land-based computer. Lockmaster screen 38 allows the lockmaster to view the lockages by tows 10, to update river conditions by pressing buttons 70, which will bring up screen 26 shown in FIG. 7 and which allows the lock master to configure the lock and update the current river conditions, wind conditions and dam conditions.

Additionally, lockmaster screen 38 allows the lockmaster to authorize passage through a lock by various tows 10.

Button 68 on lockmaster screen 38 allows the lockmaster to configure the lock. The lockmaster must update the locks status and lock code and input any unique characteristics of the lock of which pilot should be aware of, such as eddies and out-drafts. In addition, the navigation chart represented in S-57 format containing the lock and each section of river can be uploaded into the system for transmission to tow 10 and processing of distances. This provides the necessary information for the number of lock chambers, the chamber sizes, the bullnose, the guide wall, the middle wall and the guard wall sizes, as well as the location and the size of the opening of lock 12.

The system of the present invention can use both tow based sensors and land based sensors. The tow based sensors requires the outfitting of tow 10 with the sensors to detect its own location, for example, GPS receivers or radar devices. Sensors, such as radar and cameras, may be installed on the banks above and below the lock as well as on the lock itself. The most essential of the input modules 8 is the sensor module which allows the pilot interface module 100 on tow 10 to determine the position of the tow. This particular input module 8 may be run as an integral part of the pilot display application or as a separate module that transmits its information to the pilot in the same manner as any of the other input modules.

Additional input modules may include a module to gather manually entered lock configuration data from lock operators, modules transmitting real time weather information from a location at or near the lock or from the National Weather Center via the Internet. Other input modules may be connected to sensors located on the lock or elsewhere. All of the input sensors would preferably transmit their information via an SSL encrypted link and in XML format as defined by the system. Each input module 8 preferably has a digital certificate that is used in the SSL transaction which allows the pilot application to determine the source of the information and that the information has not been altered in transit between its source and its receipt by the pilot.

In the preferred embodiment of the invention, the sensor module which allows the determination of the position and speed of tow 10 is a differential GPS receiver capable of transmitting data using the NMEA Standard, an industry wide standard for the transmission of GPS position information. In addition to outputting the position of the sensor, the sensor may report the heading of the tow using an integrated GPS compass. Using these two pieces of data, in addition to the configuration of the tow as input by the pilot, it is possible to determine the boundaries of the tow with only one GPS receiver. Alternatively, multiple GPS receivers could be positioned at different points along tow 10 to give a more exact reading of the positions of the extremities of the tow. Differential GPS can be used to very accurately identify the location of GPS receivers mounted on the tow boat and barges. Differential GPS can provide accuracy to within a few feet, which will require mounting multiple battery powered GPS receivers at several locations on the barge. As an example, placing four GPS receivers at the four corners of the tow will provide coordinates that can be used to defined the barge boundary. Each GPS unit will require a wireless transmitter or a wired connection to send the GPS information to pilot interface module 100. In addition, a fixed GPS receiver will also be required on the lock to provide the differential correction required to obtain the desired accuracy.

Essential lock and river condition information can be transmitted to tow 10 by a module on lock 12 that is preferably integrated into lockmaster display 4. Lockmaster display 4 allows the lockmaster to input information about main, upstream and downstream currents, wind and dam conditions and lock and dam status information. All data communicated between the lock and the tow is preferably transmitted over a standard 802.11(b) wireless link using standard internet protocols. Data from other input sensors is preferably received into a communications port, such as an RS232 serial port, on the computer running the pilot display component. Input modules 102, 103 and 108 process the positional data to prepare it for display to the pilot and communicate the information to pilot display module 100 preferably over a loopback device, which is a method of sending information to another application on the same computer using the network, as if the information came from another computer.

There are several different types of messages which can be exchanged between the lock and the tow. For example, from the lock to the tow the following messages may be passed: initial lock messages identifying the lock, its lock code and its IP address; a lock condition message containing the most updated conditions of the lock, such as the damn opening, the river conditions and the wind; messages containing the current and forecast weather conditions.

Possible messages from the tow to the lock would include: a tow manifest message identifying the tow, its barge configuration and its load; a tow position message identifying the tow position, its dimensions and its position; lockage time message identifying the tow, the locking vent and the time logged; automatically generated requests for upstream or downstream lockage.

Examples of messages that may be passed between the tow and sensors may include: a sensor message containing the sensor reference point and the detected position or the detected distance and reference point for comparison as well as a time stamp (for a position-reporting type sensor); detected speed information.

Preferably, XML can be used to format all IP messages. In addition, there must be a security protocol for passing messages between components of the system. Although having other tow boats or parties listen to the traffic does not harm the system or compromise its integrity, it is important that tows not become confused as to which messages are intended for a particular tow. In addition, it is important that no tampering be allowed of the data being transmitted to the pilot during the approach. As such, the system must be able to maintain data integrity and be protected from hackers.

In addition to the navigation aid functions, the system of the present invention can collect data for the pilot and the lock in an accurate and timely manner by automatically logging events during a lockage and by gathering input from the pilot regarding the tow. An examples of such information is manifest information. The system can easily collect information about the barges and its load as included in the manifest. Lockage time can be tracked to allow pilots to know the average time to complete the lockage. The system of the present invention should be completely aware of when and how long the different stages of the lockage are from the perspective of the tow boat. In addition to the lockage time, the system of the present invention can also collect other pertinent information about the lockage such as the chamber used, the number of cuts and the type of lockage (i.e., single, double, etc.). In addition, the system can effectively collect information about each and every lockage made by a tow during any particular trip, thereby serving as an electronic log for the tow's trip from which reports can be generated. In addition, locks should be able to communicate with other up-stream and downstream locks to let them know of approaching tows, configuration of the tows, etc. Lastly, lock personnel are expected to update the system with the various conditions of the lock such as the dam opening, current speed and direction. As a result, a history of the lock conditions can also be drawn from the system.

While specific embodiments of the present invention have been used in an exemplary manner, this is not meant to limit the scope of the invention, which is defined by the claims which follow.

The invention claimed is:

1. A navigational aid for a watercraft navigating a waterway comprising:
   one or more sensors in said watercraft for determining the position of said watercraft with respect to a nearby structure;
   a feedback device in said watercraft for updating a pilot of said watercraft as to said position;
   said feedback device is selected from a group consisting of a visual display and an audio device;
   said visual display displays a navigational chart showing a portion of said waterway being navigated by said watercraft;
   a computer located in said watercraft, said computer generating said visual display and/or providing said audio feedback;
   said one or more sensors are coupled to said computer in said watercraft;
   at least one of said one or more sensors is a GPS receiver in said watercraft;
   said visual display includes said waterway and said structure and further wherein a representation of said watercraft is overlaid on said display with a graphical indication of the distance of one or more points on said watercraft from one or more portions of said structure; and
   said overlaid representation of said watercraft represents the actual position and orientation of said watercraft with respect to said structure.

2. The navigational aid of claim 1 wherein said waterway is a river or a canal having a structure selected from a group consisting of a lock and dam, one or more bridge piers and a dock.

3. The navigational aid of claim 2 wherein said one or more sensors are coupled to said computer via a wireless network.

4. The navigational aid of claim 3 wherein said one or more sensors are coupled to said computer via a Bluetooth network.

5. The navigational aid of claim 4 wherein said wireless network is compliant with the 802.11(b) standard.

6. The navigational aid of claim 2 wherein said one or more sensors are coupled to said computer via a hard wired connection.

7. The navigational aid of claim 2 wherein said watercraft is a tow comprising a towboat and one or more barges.

8. The navigational aid of claim 2 wherein said display is automatically zoomed to show more detail as said watercraft gets closer to said structure.

9. The navigational aid of claim 6 wherein currents in said waterway are indicated by an arrow on the display showing the direction of said current, and further wherein the strength of said current is graphically represented.

10. The navigational aid of claim 9 wherein said graphical representation of said current strength is shown by providing a correspondence between said strength of said current and the thickness of said arrow indicating the direction of said current.

11. The navigational aid of claim 2 further comprising:
a land-based computer having a visual display;
a wireless network; and
one or more antennae.

12. The navigational aid of claim 11 wherein said watercraft are connected to said wireless network when in close enough proximity to said one or more antennae to receive a signal.

13. The navigational aid of claim 12 wherein said watercraft are connected automatically to said wireless network when in close proximity to said one or more antennae.

14. The navigational aid of claim 13 wherein said watercraft-based computer and said land-based computer are able to exchange information when said watercraft is connected to said wireless network.

15. The navigational aid of claim 14 wherein structure is a lock and dam and further wherein said watercraft-based computer can automatically generate and transmit a request for lockage to said land-based computer.

16. The navigational aid of claim 15 wherein said land-based computer can generate and transmit a clearance for lockage in response to a message from said watercraft-based computer.

17. The navigational aid of claim 14 wherein said information includes readings from said one or more sensors.

18. The navigational aid of claim 17 wherein said one or more sensors are connected directly to either said land-based or said watercraft-based computer or are in communication with said land-based or said watercraft-based computer via said wireless network.

19. The navigational aid of claim 18 wherein said land-based computer is located at or near said structure and further wherein said land-based computer displays a visual representation of said waterway and said structure.

20. The navigational aid of claim 19 wherein said land-based computer further displays representations of all watercraft connected to said wireless network overlaid on said representation of said waterway and said structure.

21. The navigational aid of claim 20 wherein said representations of said watercraft correspond to the actual position of said watercraft with respect to said structure.

22. The navigational aid of claim 21 wherein said land-based computer allows the entry of waterway and structure conditions and status information, and further wherein said information is transmitted to said watercraft-based computer via said wireless network for display thereon.

23. The navigational aid of claim 22 wherein said watercraft-based computer displays the position and speed information of said watercraft.

24. The navigational aid of claim 23 wherein said watercraft-based computer local displays weather information.

25. The navigational aid of claim 24 wherein said watercraft-based computer provides audio feedback of said position and/or said speed information.

26. The navigational aid of claim 25 wherein said audio feedback are spoken words generated by a text-to-speech generator running on said watercraft-based computer.

27. The navigational aid of claim 26 wherein said position and speed information is transmitted to said land-based computer via said wireless network for display thereon.

* * * * *